US006178470B1

(12) United States Patent
Dowling

(10) Patent No.: US 6,178,470 B1
(45) Date of Patent: Jan. 23, 2001

(54) CHIP FOR CCSDS COMPATIBLE SERIAL DATA STREAMS

(75) Inventor: Jason T. Dowling, Laurel, MD (US)

(73) Assignee: The United States of America as represented by the Administrator of the National Aeronautics and Space Administration, Washington, DC (US)

( * ) Notice: Under 35 U.S.C. 154(b), the term of this patent shall be extended for 0 days.

(21) Appl. No.: 08/960,355

(22) Filed: Oct. 29, 1997

Related U.S. Application Data
(60) Provisional application No. 60/029,333, filed on Oct. 30, 1996.

(51) Int. Cl.[7] .............................. G06F 13/00; H04L 12/56
(52) U.S. Cl. ............................................. 710/52; 370/392
(58) Field of Search ........................... 371/37.1; 370/341, 370/342, 316, 392; 711/101; 710/52

(56) References Cited

U.S. PATENT DOCUMENTS

| | | | |
|---|---|---|---|
| 4,569,041 | * 2/1986 | Takeuchi et al. | 370/352 |
| 5,563,880 | * 10/1996 | Sabourin et al. | 370/312 |
| 5,717,830 | * 2/1998 | Sigler et al. | 455/426 |
| 5,790,567 | * 8/1998 | Bolotin et al. | 714/752 |
| 5,790,568 | * 8/1998 | Luong et al. | 714/781 |
| 5,835,487 | * 11/1998 | Campanella | 370/316 |
| 5,920,882 | * 7/1999 | Bennett et al. | 711/101 |

OTHER PUBLICATIONS

"Microelectronics Systems Branch Application–Specific Integrated Circuits (ASIC) Components Document," vol. 3, May 1994, No. 521–SPEC–002.

"Service Processor Card, Revision B, Hardware Definition Document," Jun. 1995, No. 521–H/W–056, pp. 2–1, 2–8, 3–8, 3–11, and 3–14.

"VLSI Technology for Smaller, Cheaper, Faster Return Link Systems," Kathy Nanzetta, Parminder Ghuman, Toby Bennett, Jeff Solomon, Jason Dowling, John Welling, published in Third International Symposium On Space Mission Operations and Ground Data Systems—Part 1, edited by James L. Rash, NASA Conference Publication 3281, Conference held at Greenbelt Marriot Hotel, Greenbelt, Maryland, USA Nov. 15–18, 1994.

* cited by examiner

Primary Examiner—Kevin J. Teska
Assistant Examiner—Lonnie A. Knox
(74) Attorney, Agent, or Firm—Eileen A. Lehmann

(57) ABSTRACT

A configurable service processor for telemetry ground stations is totally implemented in VLSI/ASIC hardware and finds use in spacecraft systems and other communications systems that operate according to CCSDS and CCSDS-like protocols. The service processor performs the traditional functions of data extraction at very high data and packet rates.

6 Claims, 11 Drawing Sheets

CHIP FOR CCSDS COMPATIBLE SERIAL DATA STREAMS

CROSS-REFERENCES TO RELATED APPLICATIONS

This application now formalizes and incorporates herein by reference Provisional Application Ser. No. 60/029,333, "Service Processor Chip," Jason Dowling, filed on Oct. 30, 1996. Applicant claims the priority date thereof under 35 U.S.C. 119(e).

The instant application is also related to application Ser. No. 08/921,666 "Parallel Integrated Frame Synchronizer Chip.," Parminder S. Ghuman et al, filed on Sep. 2, 1997, incorporating by reference and claiming the priority of Provisional Application Ser. No. 60/028,733, "Parallel Integrated Frame Synchronizer Chip," Parminder S. Ghuman et al, filed on Oct. 15, 1996, these applications also being incorporated herein by reference.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457), and may be manufactured and used by or for the Government for governmental purposes without the payment of any royalties thereon or therefor.

TECHNICAL FIELD

This invention relates generally to apparatus for processing digital data and more particularly to a service processor for processing a serial data stream such as that received from an airborne vehicle such as a spacecraft.

BACKGROUND ART

Airborne vehicles, such as spacecraft have been used to both relay data and to generate data. When functioning as a relay, it may receive data from a source, such as a ground transmitter, i.e., on an up-link, store the data, and then transmit the data, on instruction, to a ground station, i.e., on a return- or down-link. When functioning as a data generator, the spacecraft may have one or more instruments functioning as sensors with the sensor information being stored and transmitted, on instruction, to a ground station on a down-link. With a plurality of instruments, the sensor information will be multiplexed. Whether functioning as a relay or a generator, with or without multiplexing, the spacecraft will typically convert and store information in binary form and thereafter down-link a serial data stream. The serial data stream contains the binary information that is embedded in the transmitted RF signal through a number of modulation schemes.

Regardless of spacecraft configuration and design particulars, a ground station receiving spacecraft transmissions will be receiving a continuous RF serial data stream which must undergo signal processing of some kind to extract information from the data stream. The configuration and complexity of the signal processing will be determined by the complexity of the serial data stream signal.

Relatively inexpensive, less complex systems include a low data rate transmitter, transmitting a signal in the order of kilo bits per second (Kbps), to a spacecraft. The transmitter signal includes transmitter identification (ID). The spacecraft functions to receive, store, and "dump" (transmit) on command. The spacecraft receiver typically will include demodulation and error correction after which the data is stored until the dump instruction is received. Thereafter, the spacecraft will transmit to a ground station. These spacecraft will often transmit at Ka, Ku, S or X bands, where the low data rate information is embedded on the RF employing simple phase modulation. In some cases, more sophisticated modulation schemes are employed, such as binary phase shift keyed (BPSK) or quadrature phase shift keyed (QPSK) modulation. These spacecraft are typically in low earth orbit (LEO) where the orbit is known and transmissions to the spacecraft from the data source, e.g., ground, and from the spacecraft to the ground station, can be appropriately timed. Some of these systems employ relay satellites as well.

When the spacecraft transmission, including the ID, is received at the ground station, it must be suitably processed. While ground stations vary in terms of complexity, modern ground stations normally will contain some common features. These would include, in the order of the direction of signal flow, an antenna followed by a receiver with an RF gain stage, down conversion to an intermediate frequency and a demodulation stage. The output of the demodulator would then be fed to a bit synchronizer to synchronize the bit stream to a system clock. At this point, a serial data stream exists that is, in essence, the same as that received at the ground station, except that it is at a much lower frequency, i.e., a binary series of ones and zeros. As yet, however, no useful information can be extracted because the beginning and end of the encoded information is unknown. The return- or down-link processing from this point generally involves the extraction of framed digital data from the bit stream, correction of the fame to frame data, validation of the protocol structures within the frame, and the extraction of user data. For these purposes, the data stream is inputted into a frame synchronizer followed by frame error detector and corrector, often a Reed-Solomon type, and thereafter followed by a service processor.

The frame synchronizer determines the telemetry frame boundaries from the bit stream by detecting sync markers embedded in the bit stream. The output of the frame synchronizer will then be inputted to the error detection and correction circuitry that detects and corrects frame-to-frame errors caused by transmission disturbances, in essence, with parity checks. Thus, the output at this point is a corrected telemetry frame that, as yet, has no extraction of any particular data. For this purpose, the corrected telemetry frames are inputted to a service processor. While a service processor may perform a number of functions, its basic function is packet extraction which refers to the extraction, and possible reconstruction, of packets of data from the frame synchronizer. A packet is, by definition, associated with a single instrument or other signal source. A packet of data not only contains data related to a single instrument or other source, it contains "overhead" data relating to the source. The overhead data includes such things as packet length as well as spacecraft and application IDs from which the particular source ID may be derived. These IDs are contained in a transfer frame and it is the information in the transfer frame that makes it possible for the service processor, the subject of the instant application, to extract packets relating to a given, predetermined source at a given time. More precisely, a transfer frame contains information pertaining to a transmitting spacecraft as well as a data area containing data from a particular instrument or other source. Spacecraft information includes spacecraft and channel sequence identifiers. Telemetry ground stations use the channel sequence count to check for the receipt of all data from a specific channel. Specifically, the ground station service processors use the spacecraft and instrument IDs and the sequence count to check for errors in terms of the proper receipt of data.

Prior to the 1980's, the National Aeronautics and Space Administration (NASA) did not have standards for data transmission formats. Each spacecraft mission had its own protocol. The Consultative Committee on Space Data Systems (CCSDS) was formed to develop a set of recommended space data system standards and these were implemented in the mid-to-late 1980's. These standards impacted the design of both frame synchronizers and service processors. The last set of standards published by the Committee was in a document entitled "Advanced Orbiting Systems, Networks and Data Links: Architectural Specification," CCSDS 701.o-B-2, Blue Book, November 1992. This document is on the Internet and is generally known to those involved in spacecraft systems design.

Service processing was implemented with a reliance on software. Both the real time data path as well as the decision making process were completely embedded in software that functioned to extract packets of data with given IDs and then carry out the particular algorithms for processing that data The hardware portion of the processor was responsible for data movement or routing. This implementation was capable of processing 100's of Kbps in real time. This kind of software implementation is still sufficient for current, inexpensive, low data rate spacecraft. The improvement in related hardware has not significantly improved the use of these software based service processors with the higher data rate systems. The processing of the frame data was, in essence, all accomplished by inherently slow serial operations. In addition to packet extraction and algorithm application to the data, service processors detect packet errors and provide the option of using or not using the data. There is no error correction function associated with service processors.

One of the significant problems with the prior art architecture is the low bandwidth utilization of the data path. This is due to the slow response time of software embedded decision making algorithms. For each packet, the fields must be extracted from the data path and analyzed one by one. This serial chain of events causes the data path to stall. Once a decision has been made, the data flow proceeds at a high rate. Software simply cannot keep up with the time that it takes to move the data. Further, there is the possibility of high packet rates. While a packet can be of any bit/byte length, a packet may be from 7 to 65542 bytes as specified by the CCSDS. However, the overhead for processing a packet is constant regardless of the size of the packet because large and small packets are transmitted at the same data rate, i.e., higher packet rates cause the fixed amount of overhead to be performed more frequently per unit time. Thus, the decision making process can quickly become overwhelmed by a burst of small packets.

While the prior art has taken some advantage of VLSI technology with the development of application specific integrated circuits (ASICs), the prior art has not included, and there remains the need for, the development of service processors, preferably in the form of ASICs, that eliminate all software from the service processor functions while operating at the highest current data rates.

SUMMARY OF INVENTION

Accordingly, it is an object of the present invention to provide an improvement in apparatus which receives a digital data stream from airborne vehicles, such as spacecraft.

It is another object of the invention to provide an improvement in apparatus for return link signal processing of a serial data stream from spacecraft.

It is a further object of the invention to provide an improvement in apparatus for implementing service processing of spacecraft originated, return link serial data streams.

It is still another object of the invention to provide an improved, hardware implemented service processor.

It is a still further object of the invention to provide an improved, low cost, high speed, flexible, VLSI/ASIC service processor for real time processing of high data rate, return link serial data streams.

It is yet another object of the invention to provide an improved service processor with a flexible configuration that allows for the extraction of data that satisfies both CCSDS and CCSDS-like protocols.

It is a yet further object of the invention to provide improved, lower cost ground stations that are less expensive to both purchase and maintain.

It is a still further object of the invention to provide an improved service processor that is configurable in terms of frame and packet quality checking as well as data routing.

The foregoing and other objects of the invention are achieved by the provision of solely hardware based service processor architecture. By this, it is meant that the means for configuring the service processor for particular spacecraft characteristics, i.e., the means for data management configuration, the means for data routing within the service processor, and the means for processing the data according to a particular transfer function or algorithm, are all performed without software.

DETAILED DESCRIPTION OF THE INVENTION

The hereinafter described service processor takes advantage of available VLSI densities in a VLSI application specific integrated circuit (ASIC) component. It is usefull for return link data processing and, in the embodiment described, it is usefull in processing the widely adopted packet telemetry protocols recommended as space data standards by the CCSDS as well as CCSDS-like protocols. These protocols have been adopted for most future spacecraft missions, particularly for NASA related missions.

This service processor advances the state of the art in many ways, one of the more important of which is the capability to process very high data rates associated with a number of the more recent spacecraft that typically transmit in the 50 Mbps to 150 Mbps range. The instant service processor more than meets current needs by providing up to and beyond 400 Mbps operation with packet throughput rates in the area of millions of packets per second. Fundamentally, this capability is achieved by the elimination of software, the use of VLSI/ASIC architecture, configurability of the service processor for various missions through the use of variable microprocessor or microprocessor-like setups, and the use of some parallel operations, rather than serial operations, within the processor. The VLSI/ASIC architecture is very cost effective in production.

Figure 1:
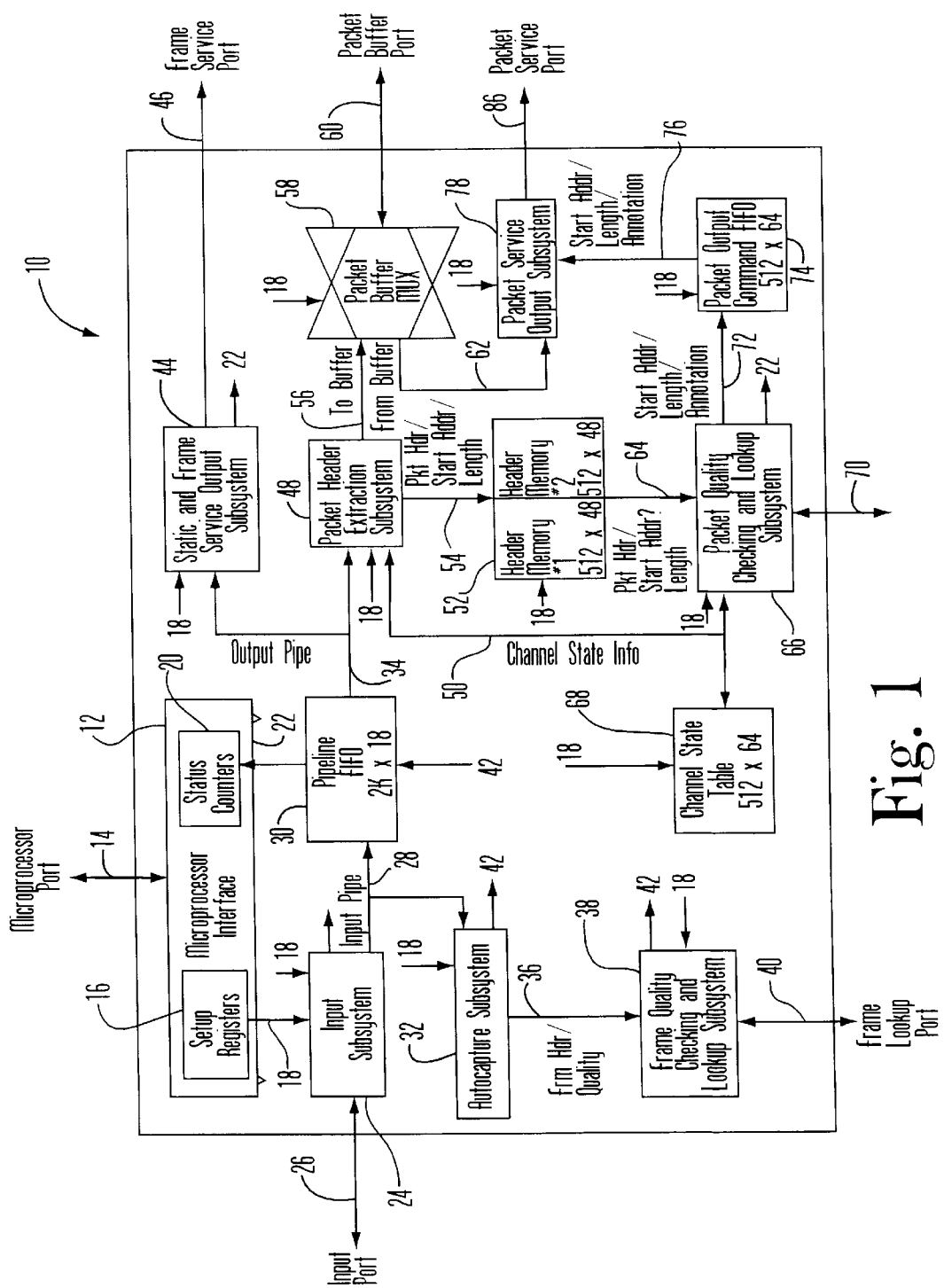
FIG. 1 is an electronics block diagram of an embodiment of service processor apparatus for frame and packet extraction and processing according to the subject invention.

Referring now to the drawings and more particularly to FIG. 1, shown thereat is a high level block diagram 10 of the subject service processor wherein a microprocessor (not shown) drives a microprocessor interface 12 at input/output port 14. The microprocessor functions to program setup registers 16, through the microprocessor interface 12. The setup registers, in turn, set up various electronic blocks shown in FIG. 1 (the "blocks") in the service processor for particular functions by providing an output and inputs 18 (connections not shown) that customize or setup those blocks, for instance, for a particular spacecraft instrument, whose data is about to be processed by service processor 10. The status counters 20 provide a mechanism for data quality accounting. This means that certain critical events are continuously tracked. To this end, the status counters obtain information from various blocks via input/outputs 22 (connections not shown) and outputs the status of those blocks to the microprocessor through microprocessor interface 12. The blocks furnishing status information to status counters 20 are the input subsystem 24, the static and frame service output subsystem 44, and the packet quality checking and lookup subsystem 66. Status counters 20 store such information as total number of frames inputted and outputted, and total number of packets outputted. The microprocessor is also employed to setup external lookup tables (not shown), through interface 12. These lookup tables are frame and packet lookup tables that are configured by the microprocessor to contain frame and packet information that specifically relate to the particular spacecraft instrument data being processed. One such subsystem to which the output 18 of setup registers 16 is connected is input subsystem 24.

The basic function of the input subsystem is to move frame data from an external source to an internal FIFO memory. This subsystem is also responsible for counting the length of the input frames, and additionally, it provides a timeout mechanism that counts the number of clocks that data is available. If the count reaches a selectable threshold, a timeout event will be generated. To this end, an external input 26, providing corrected frame data, is connected, through the input port, to input subsystem 24. Input 26 inputs frame synchronizer data and clock after frame error detection and correction. It is read into input 26 from an external synchronous FIFO (not shown). The output 28 of input subsystem 24 contains frame data and is passed on for frame and packet processing and extraction, both to the pipeline FIFO 30 and the autocapture subsystem 32.

Figure 2A:
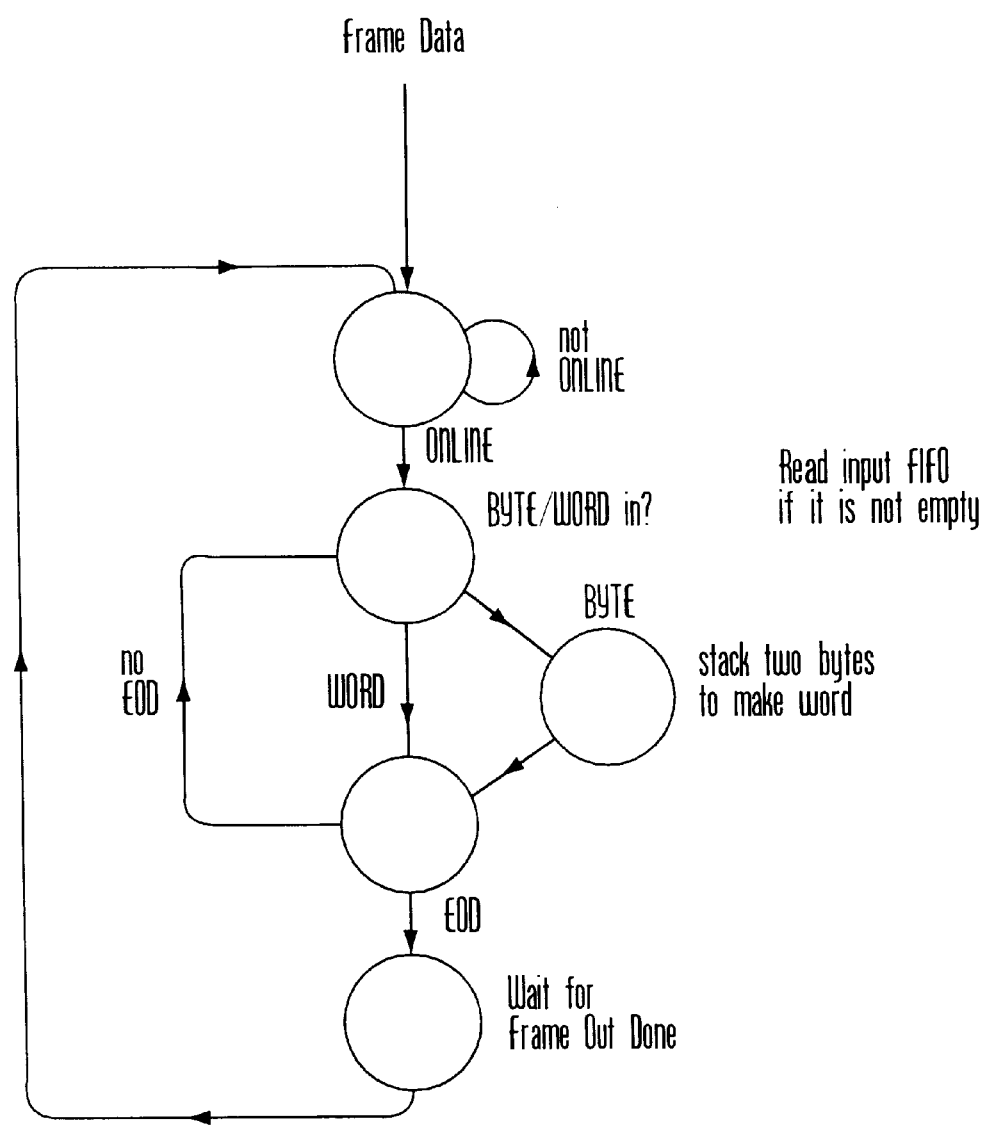
FIG. 2A is the flow diagram for the input subsystem shown in FIG. 1 for inputting data into said subsystem.

FIG. 2A is the algorithm for inputting data from input 26 into input subsystem 24. The term "online" refers to the service processor being ready to process; "byte" refers to 8 bits while "word" refers to 16 bits. If a byte is present, the path is different than that for a word and two bytes are then stacked to form a word. EOD means that the input subsystem is to keep writing into the pipeline FIFO 30 until the end of the data is reached. The term "wait for frame out done" refers to an instruction not to accept a new frame for processing until the completion of processing of the current frame being processed. As with the other flow diagrams, including those carrying out algorithms, it is irrelevant what logic is employed.

Figure 2B:
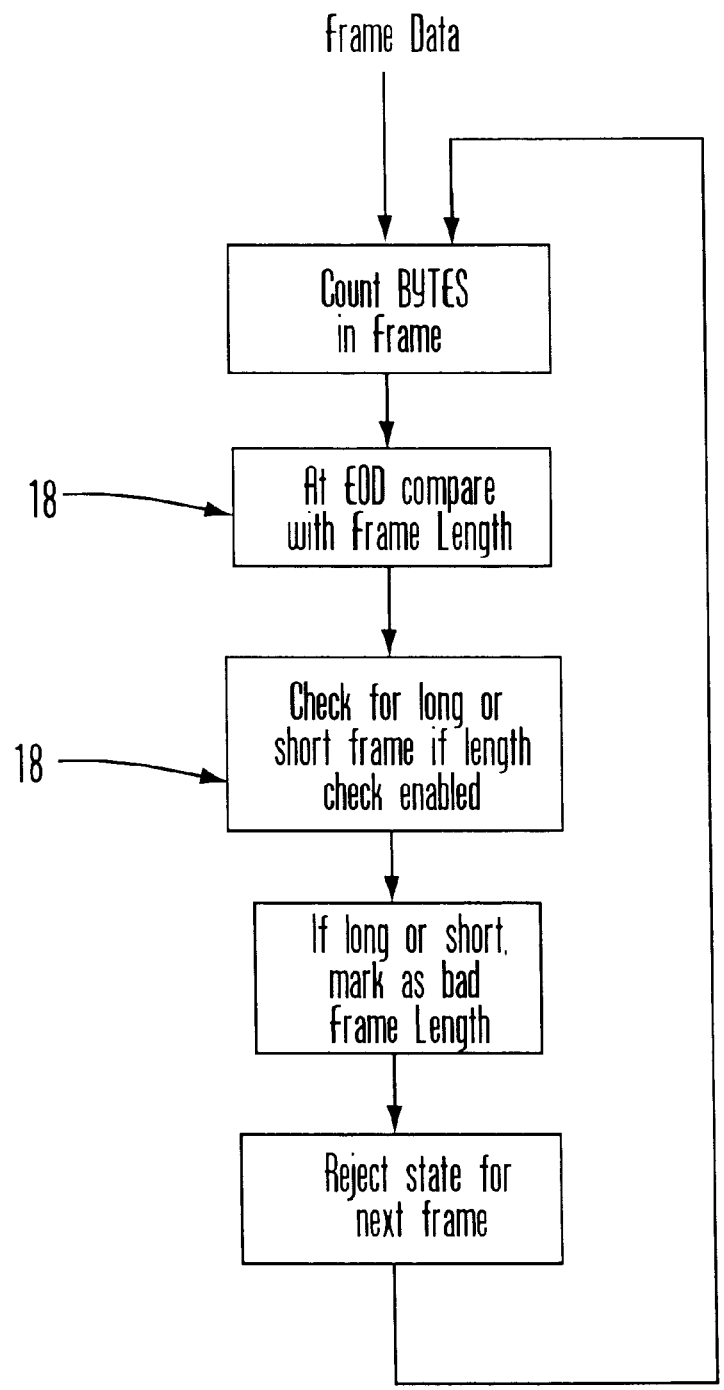
FIG. 2B is the flow diagram for the input subsystem shown in FIG. 1 for counting bytes inputted into said subsystem in FIG. 1.

FIG. 2B is the algorithm for counting bytes coming into input 26. It determines the accuracy or inaccuracy of the "frame length" where the frame length is inputted from the microprocessor. The algorithm checks for long or short length if the length check is enabled. The input subsystem 24 is configured to make this check by the setup registers 16. If the length check is enabled and the frame length does not conform to the requirement, the frame is labeled as inaccurate and rejected, but only if required.

Figure 2C:
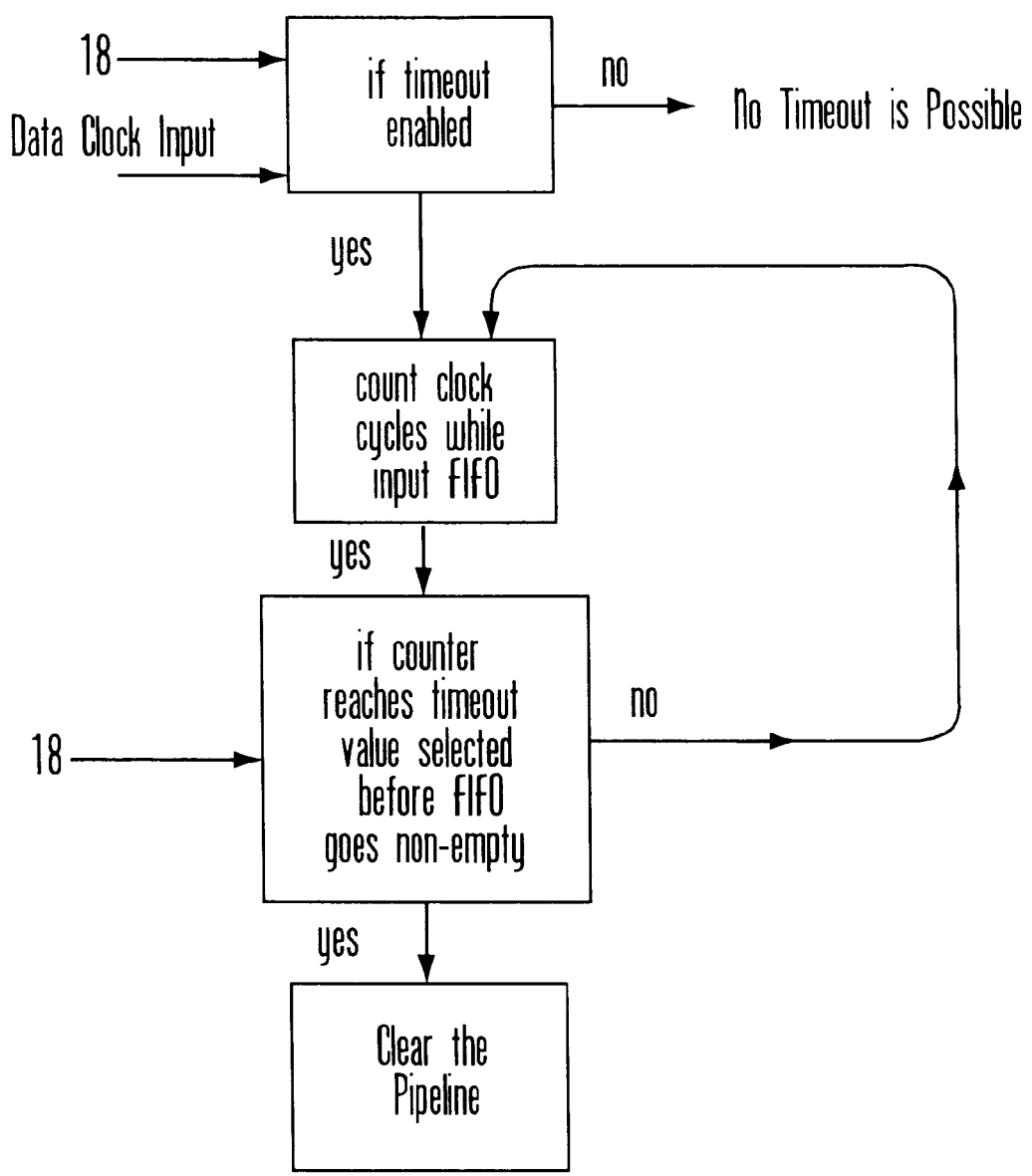
FIG. 2C is the flow diagram for the input subsystem shown in FIG. I for allowing processing of discontinuous data inputted into said subsystem.

FIG. 2C is the algorithm allowing input subsystem 24 to process discontinuous data. This algorithm takes the data clock portion of input 26, counts data clock cycles, and then decides whether the clock count exceeds the preselected count stored in setup register 16 and inputted to the input subsystem at 18. The preselected count in the setup register is obtained from the external microprocessor. If the actual count exceeds the predetermined count, all data in the service processor is transferred out all output ports.

The pipeline FIFO 30 captures and stores frame data. It is simply a memory device. Pipeline FIFO 30, after accepting data on line 28, takes that data and places it in its 2K×18 memory and outputs that data in a FIFO fashion on output 34 to the static and frame service output subsystem 44 and to the packet header extraction and boundary determination subsystem 48.

The input subsystem 24 also has its output 28 connected to the autocapture subsystem 32. While data transfer into the pipeline FIFO 30 is occurring, the autocapture subsystem 32 captures information such as frame header and quality annotations using reference points that are generated and then stored in the setup registers to locate these fields within the frame. These fields are used for frame identification, frame quality determination, and frame and packet annotations. The autocapture subsystem 32 implements seven autocapture mechanisms. Four among the seven are used for capturing quality annotations added by the frame synchronizer to the frame data. The annotations may be prepended or appended to the frame data The quality annotations may include the frame synchronizer status structure and the error correction status structure which may have been attached to the frames during upstream processing, i.e., prior to service processing. The fifth autocapture mechanism is used to capture multiplexed protocol unit header or bitstream protocol data unit header. The sixth mechanism is used to capture the primary frame header which contains information such as spacecraft ID. The last mechanism is used to capture time information indicating the time a frame was received from a spacecraft.

Figure 3A:
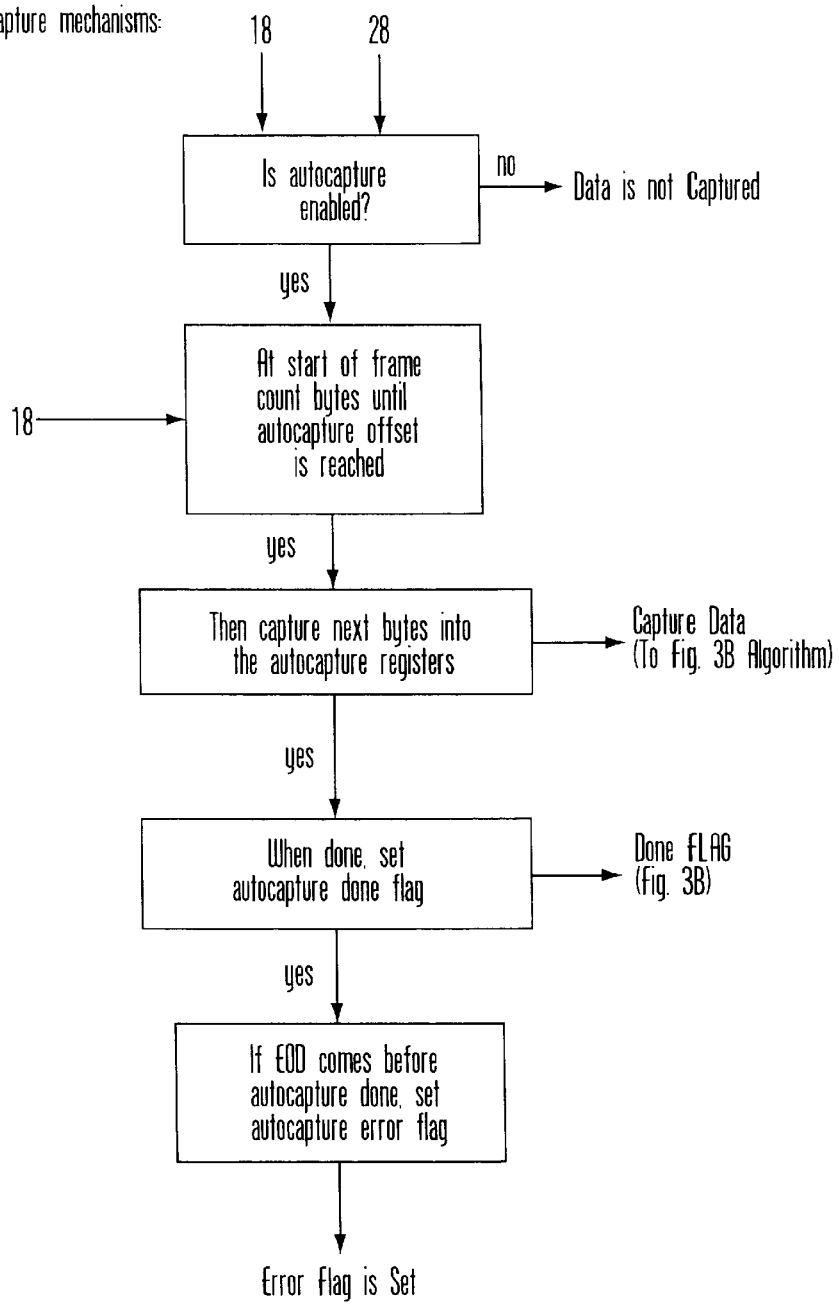
FIG. 3A is the flow diagram for the autocapture subsystem shown in FIG. 1 for all autocapture mechanisms.
Figure 3B:
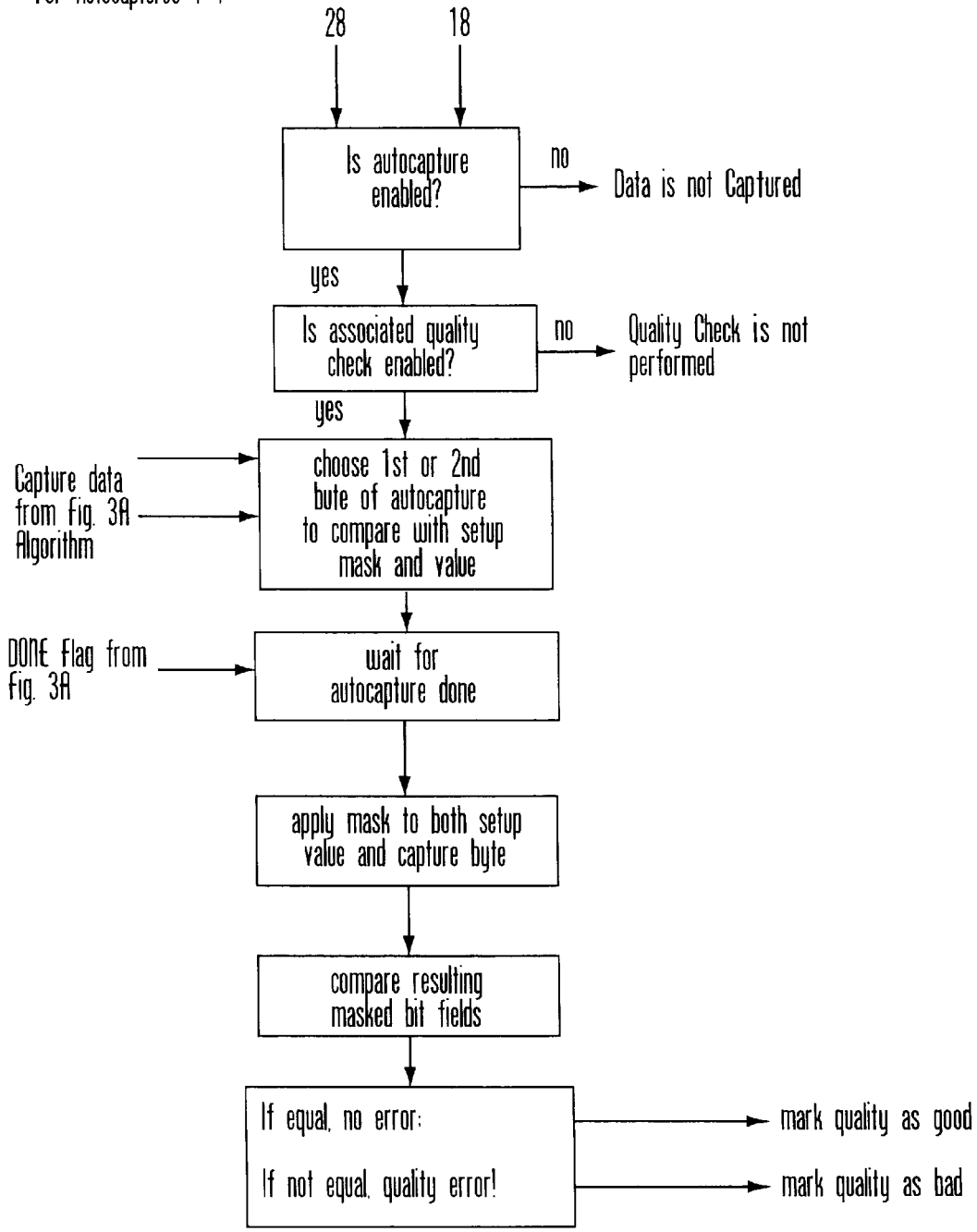
FIG. 3B is the flow diagram for the autocapture subsystem shown in FIG. 1 for some autocapture mechanisms.

FIGS. 3A and 3B depict the algorithms that provide the seven mechanisms and four mechanisms, respectively, in the autocapture subsystem 32. The FIG. 3A algorithm is used to capture frame information such as the frame header and quality information. The inputs are the data on line 28 from the input subsystem and line 18 from the setup registers 16. The register information enables the algorithm. If there is no enablement, data is not processed. If there is enablement, frame synchronizer information indicates the start of each frame, a byte count is started and continues until a predetermined count is reached. The predetermined count comes from the setup registers on line 18. The data is then captured and stored in registers (not shown) within the autocapture subsystem. A done flag is generated when the data capture is completed with an error flag being generated if an EOD occurs before the autocapture is completed.

FIG. 3B, as previously indicated, depicts the algorithm used solely for autocapture mechanisms one through four. It is employed to capture quality annotations which may have been prepended or appended to incoming frame data. Shown are input lines 18 and 28 that include setup information and the frame data, respectively. Setup mask and value came from setup register 18. Comparison checks are made for equal or unequal values corresponding to quality. If equal, captured data is marked as good, if unequal, the captured data is marked as bad.

After processing is completed as shown in FIGS. 3A and 3B, the autocapture subsystem 32 outputs frame quality information on line 36 to the frame quality checking and lookup subsystem 38. With respect to subsystem 38, frame quality checking includes the verification of the frame version (CCSDS specifies version 1 and version 2 frames), frame sequence counts and fame length (compared to anticipated count and length), as well as the quality of annotations applied by the upstream hardware, e.g., the frame synchronizer, and embedded in the frames. This subsystem is capable of processing two different frame versions at the same time. The lookup function refers to the ability to form addresses for accessing an external memory device. After capturing frame header information, the first two bytes of information which contain frame version, spacecraft ID and virtual channel ID are used to form an address. This address is used to look up desired information from an external memory device. The information that is fetched from this memory device is used to instruct subsystem 38 how to process the frame.

Figure 4A:
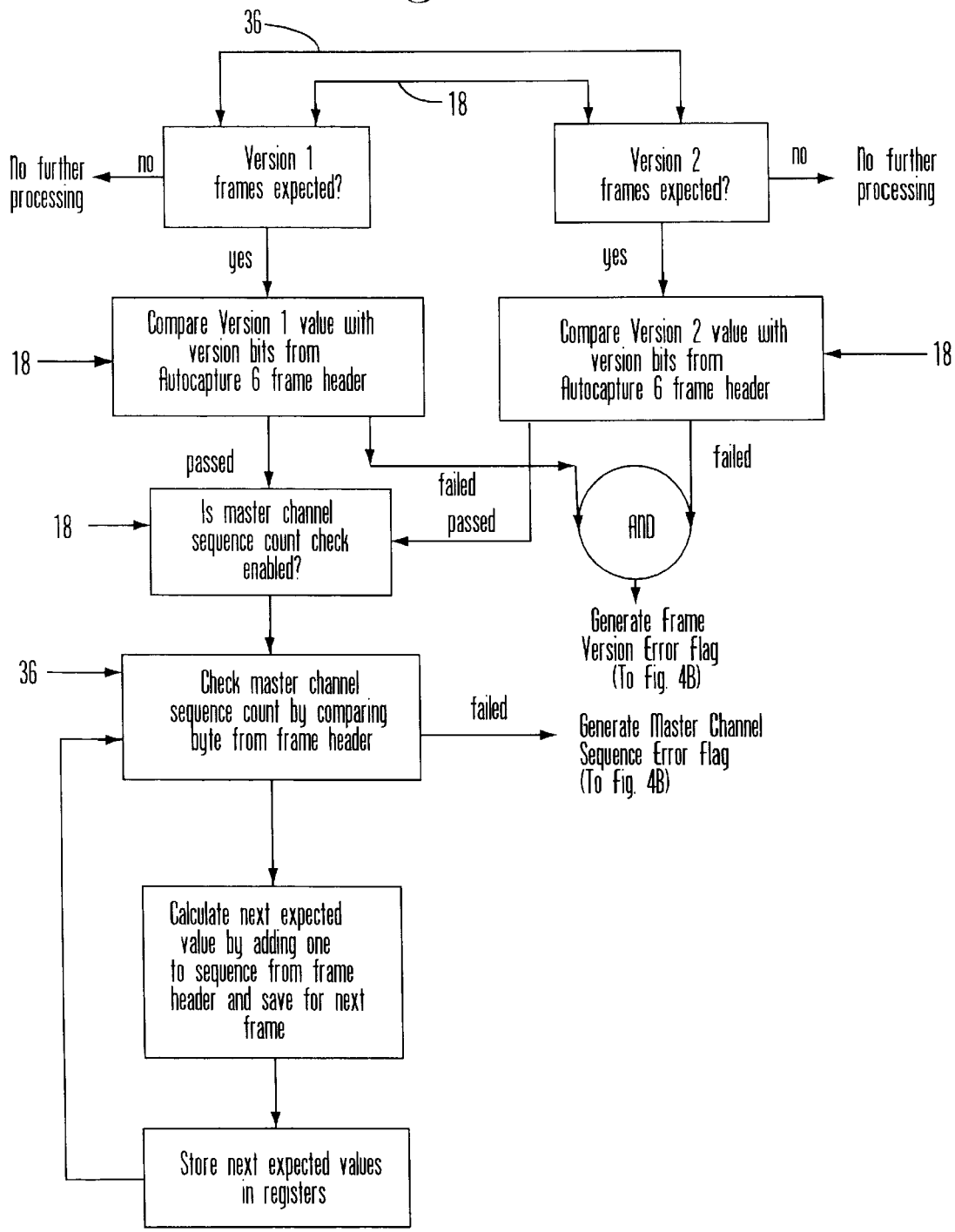
FIG. 4A is the flow diagram for the frame quality checking and lookup subsystem shown in FIG. 1 for deciding whether or not to perform the frame lookup process.

FIG. 4A depicts the algorithm responsible for carrying out the frame quality checking function of subsystem 38. Inputs are from the setup registers, line 18, and quality information on line 36 from the autocapture subsystem 32. The algorithm is set up for both version 1 and version 2 frames. In some cases, the version is unimportant. In other cases, the version must be known in order to continue processing. In either case, the setup registers contain this information and this is communicated to the frame quality checking and frame lookup subsystem on line 18 as shown in this figure. The other input is on line 36 from the autocapture subsystem 32. If the version expected is "none", then a comparison is made between the value expected and the value actually observed from line 36. If both values do not compare to expected values, then a frame version error flag is generated. The term "autocapture 6" refers to mechanism 6 as described above. If a given version finds a match, only that version is further processed, i.e., at most, there can be only one correct version. On the other hand, there may be neither, in which case a frame version error flag is generated and there is no further processing. When further processing is appropriate because there is a match, the process then performs other quality checks on line 36 data, including a master channel sequence count check using line 18 setup data. The master channel sequence count refers to a count of sequential frames using the frame numbers assigned and stored in each frame header. This functions to detect a gap in frames received. If the quality checks are enabled, then data captured values and setup values are compared for a match. If there is no match, then the master channel sequence error flag is generated. Whether or not there is a match, the frame sequence count is incremented by one and stored in registers (not shown) located within this subsystem 38. This incremented value is needed to process the next incoming frame, as it indicates the next expected frame by number.

Figure 4B:
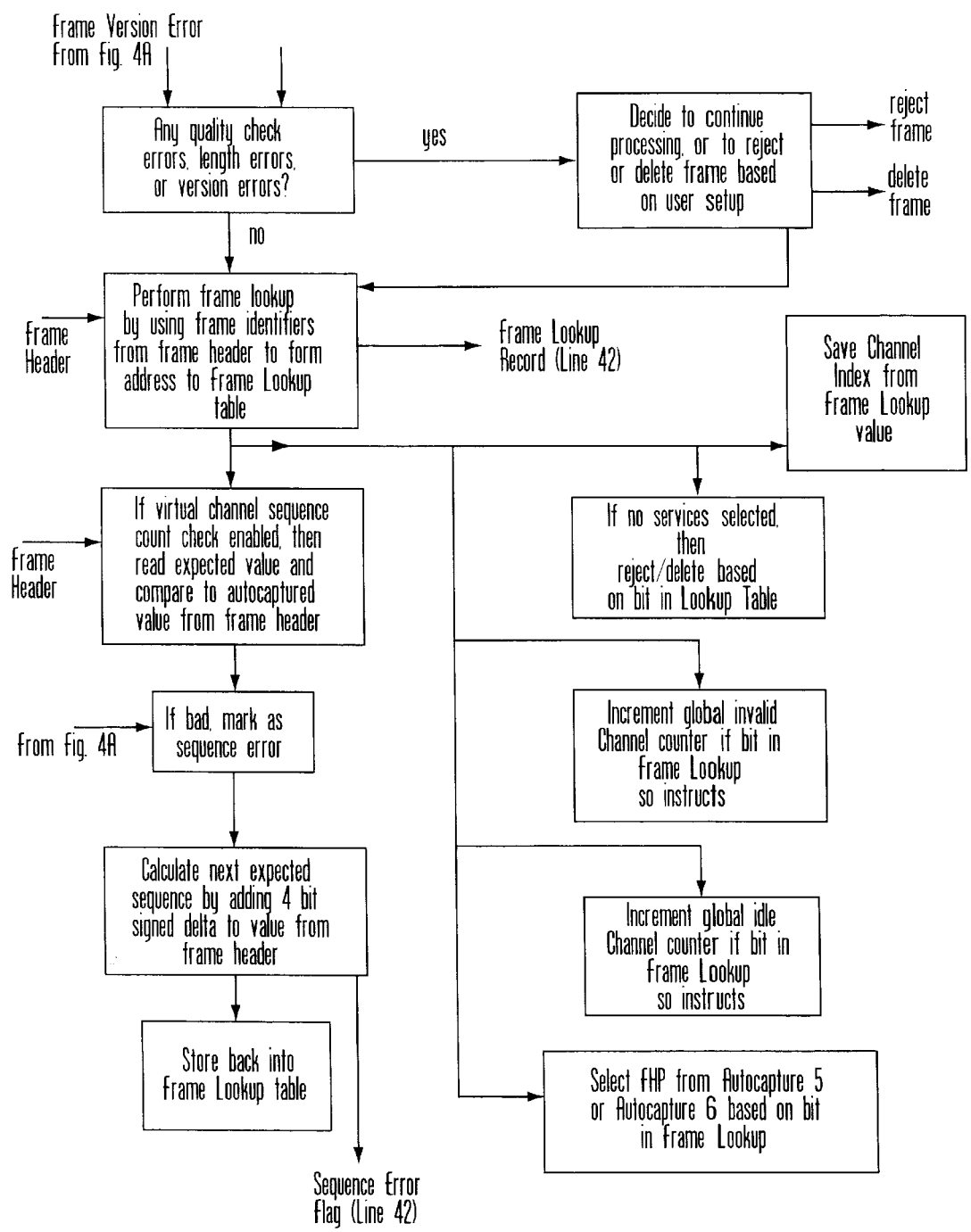
FIG. 4B is the flow diagram for the frame quality checking and lookup subsystem shown in FIG. 1 for performing the frame lookup process.

The algorithm represented by FIG. 4B depicts the frame lookup process. The input to this flow diagram includes already performed quality checks. The flow diagram then uses this quality check information to make a decision whether to perform a frame lookup access. If the quality check information indicates that the frame quality meets predetermined specifications for the particular mission, then the address for the particular frame lookup record is formed using the particular frame identifiers embedded in the frame header. When the address is obtained, then the frame lookup table is accessed for such data as frame service information and channel index information. Frame service information includes information relating to how the frame is to be processed, i.e., how data embedded in the frame is to be extracted and processed. Channel index information is an assigned, unique number which identifies a virtual channel, the virtual channel including only those frames obtained out of a multiplexed transmission that pertains to a single particular instrument.

Also fetched from the frame lookup table is the next expected virtual channel sequence value. This is used to check the virtual channel sequence count with the frame header sequence count and compare their values to see if they match. If they do not match, then a virtual channel sequence error flag is generated. In any event, the next expected virtual channel sequence value is calculated and stored back into the frame lookup table via line 40. The master channel sequence error and virtual channel sequence error flags are ultimately combined in an "or" function, to form a generic sequence error flag which is outputted on line 42 to pipeline FIFO 30, along with all autocaptured quality information and frame lookup information.

Figure 5:
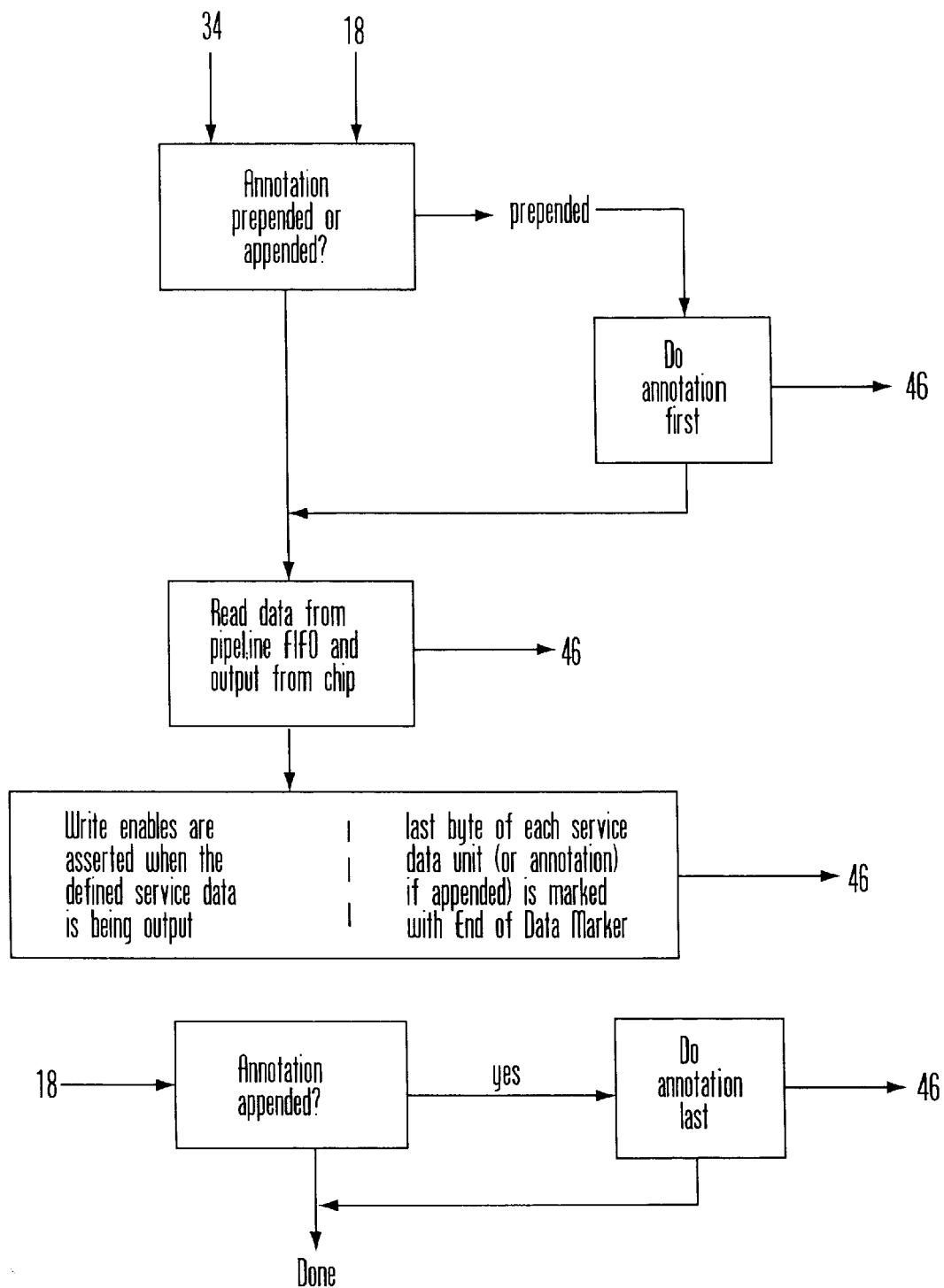
FIG. 5 is the flow diagram for the static and frame service output subsystem shown in FIG. 1.

The static and fame service output subsystem 44 takes the output of the pipeline FIFO, including frame data, frame quality, and lookup information and uses this information, employing the frame lookup information, to output this frame data on the frame service port 46 for forming parallel outputs to further external destinations. The frame lookup and frame quality information is used as annotation which is either prepended or appended to the frame data when outputted. This subsystem determines whether the fame annotation is to be prepended or appended to the output frames. If prepended, the frame annotation is sent out the frame output port followed by the frame data. If the annotation is being appended, the frame data is sent out first followed by the frame annotation. The flow chart depicted in FIG. 5 shows the decision making process for carrying out the functions of the static and frame service output subsystem 44.

The packet header extraction subsystem 48 inputs the output of pipeline FIFO on line 34 and, additionally inputs channel state record data 50 from channel state table 68 indicating the state of the virtual channel. This specifically includes the address of where to begin writing data into external memory accessed through packet buffer port, line 60. The function of this block is to find the location of the packet headers within the frame and thereafter extract those headers. The extracted packet headers are outputted along with packet length and packet address to header memories 52 on line 54. Packet headers with length and address and other packet quality information form "packet header records". Additionally, all packet data is outputted on line 56 where it is inputted to the bidirectional packet buffer MUX 58. The MUX 58 multiplexes the incoming packet data and outputs that data on line 60, at the packet buffer port, to an external packet buffer memory (not shown). The MUX 58 also inputs data on line 60. This inputted data is also packet data, this data being that temporarily stored in the external memory. All this packet data is multiplexed by the MUX 58 and this multiplexed data is outputted on line 62 to the packet service output subsystem 78. There is no capability in the MUX for directly outputting packet data from line 56 out line 62. It must first be stored externally over line 60.

Any algorithm performing the extraction function for outputting extracted packet header records on line 54 must, for all packets within the frame perform the following functions: locate the packet header, determine packet length, calculate the location of the next packet header employing the previously determined packet length, check packet version for CCSDS compliance, and determine the number of packets per frame. The packet versions are a part of the CCSDS standards.

The packet header memories 52 are buffers providing temporary memory storage of packet header records that are inputted on line 54 and outputted on line 64. The memories are configured in two banks, each being 512×48 bits in size. While the packet header records from one frame are being written into one bank, the packet header records from the previous frame already stored in the other bank are being outputted on line 64. When these inputting and outputting functions are completed, the memory bank that has just stored the last incoming record is then switched to an outputting function, and the memory bank just outputted is then switched to an input or storage mode.

The packet quality checking and lookup subsystem 66 takes packet header records from the line 64 input and processes each record. Channel state information data is also inputted on bidirectional line 50 from the channel state table 68. This table is a 512×64 memory that temporarily stores the state of all channels being processed during a particular telemetry pass.

Figure 6:
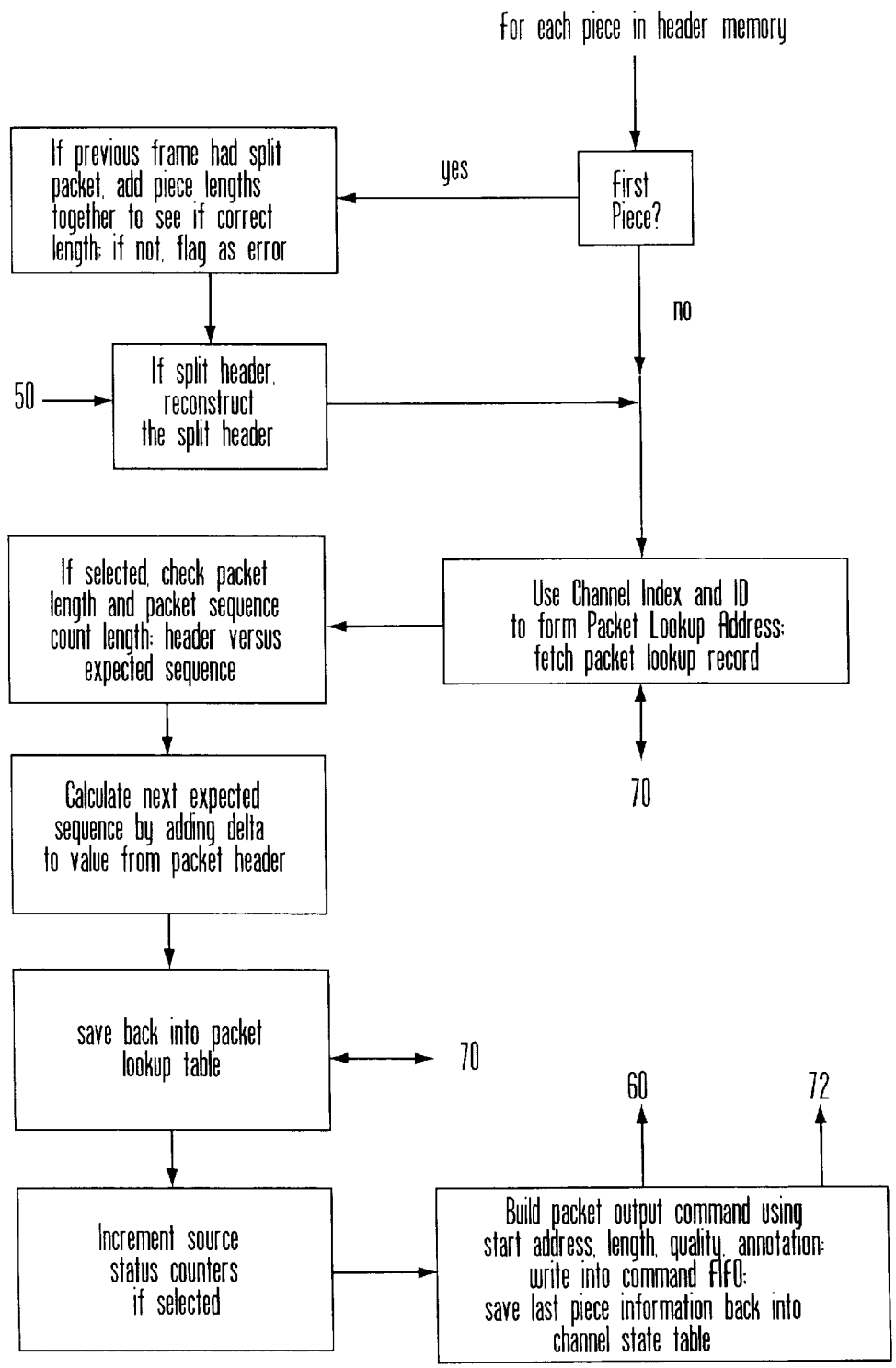
FIG. 6 is the flow diagram for the packet quality checking and lookup subsystem shown in FIG. 1.

Subsystem 66 first reads the data from channel state table 68, and after all packet header records from a given frame are processed, the channel state table 68 is updated by passing information back from block 66 over bidirectional line 50. FIG. 6 depicts the algorithm carried out by the packet quality checking and lookup subsystem 66. For each packet header, the first packet header record from the output bank is identified and reconstructed with information from the channel state table 58. This reconstruction results in reconstituting the whole packet. Part of the reconstruction process may or may not include reconstruction of a split packet header. Reconstruction also includes adding packet piece lengths together to verify the total length of the packet. These processes are only done for the first packet header record.

For all packet header records, the following processes are implemented. The channel index and the packet identifiers from the packet header are combined to form a packet look-up address. The address is used to fetch a packet lookup record from an external packet lookup table via the packet lookup port, line 70. The packet lookup record contains packet routing, processing, next expected packet sequence and length, and the source ID that is the unique number assigned to each packet source, e.g., a specific spacecraft instrument. After these operations are completed, packet length and sequence are verified and the next expected sequence is calculated and stored back into the external packet lookup table via line 70. Using the verified packet length and the packet address from the packet header record, packet output commands related to a single given packet are generated and outputted to the packet output command FIFO, block 74, via line 72. These are commands employed to instruct the packet service output subsystem 78 how to locate and output a given packet. After all packet header records are processed, the channel state data is written back into the channel state table 68 on line 50.

Packet output command FIFO 74 is a memory which temporarily stores packet output commands received from subsystem 66 via line 72. It outputs those commands to the packet service output subsystem 78 via line 76 when commands are requested from subsystem 78. This memory is 512×64 in size. Using the commands received on line 76, the packet service output subsystem 78 fetches packets from the external packet buffer memory, inputted through line 60, through MUX 58. These packets, in turn, are then placed on line 62, and outputted through the packet service port. The output on the packet service port, line 80, includes the packets and any annotations related to that packet which may be prepended or appended to the packet. The particular packet at this service port at a given time is related to commands received, these commands having included a particular address.

Figure 7:
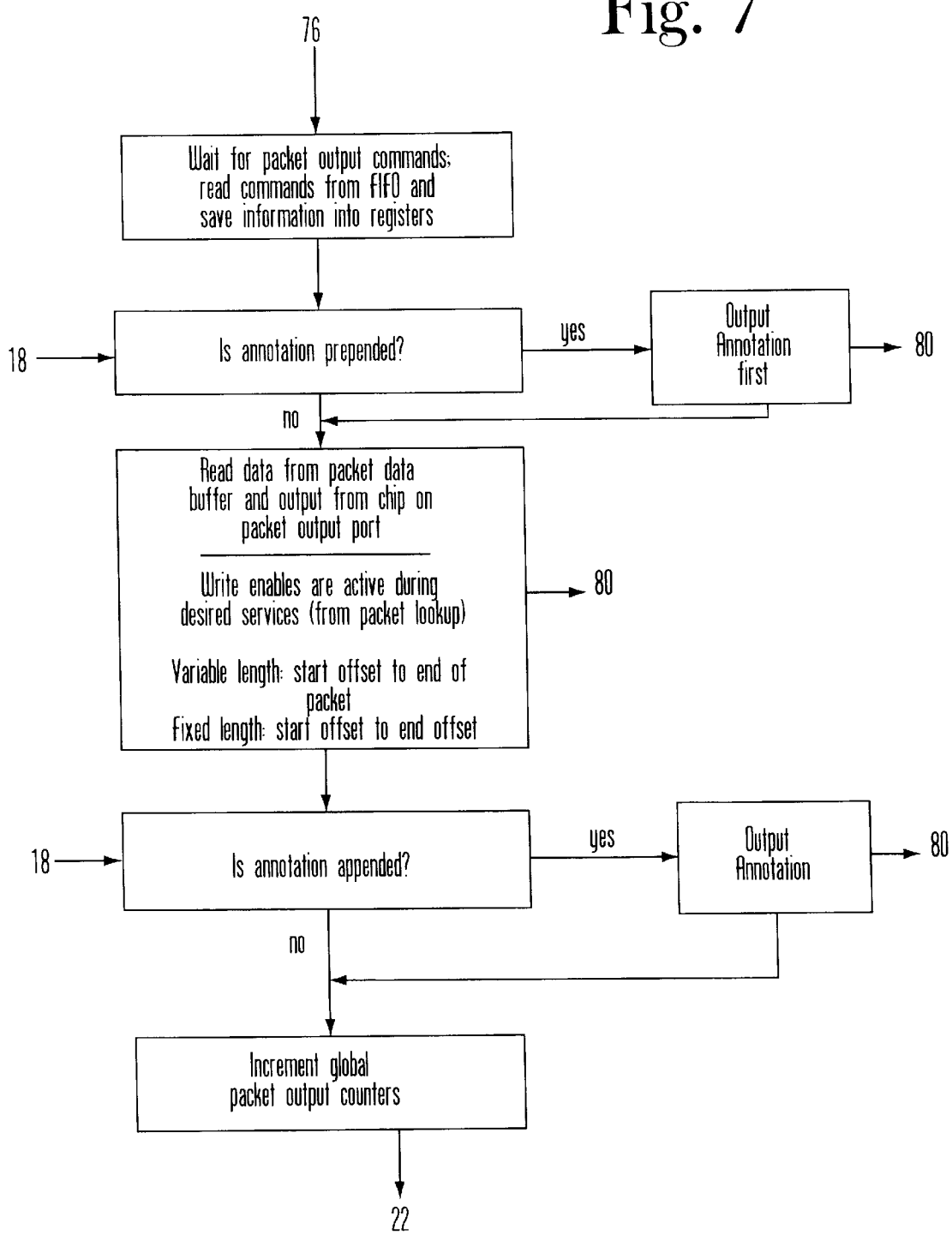
FIG. 7 is the flow diagram for the packet service output subsystem shown in FIG. 1.

The algorithm depicted in FIG. 7 provides the functions for the packet service output subsystem 78. For each packet, the packet output commands are read from the packet output command FIFO 74 and inputted into and stored in temporary registers. Next, if the annotation is to be prepended to the packet, the annotation is now outputted on line 80 followed by the packet data. Finally, if the annotation is to be appended, it is outputted after the packet data on line 80.

The frame service port furnishes the inputted error corrected frames and outputs these frames, with added annotations, to various destinations for further processing. At the same time, the packet service port furnishes packets extracted from the inputted frames with annotations added by the service processor. The packet service port also routes the packet to other destinations for further processing.

What is claimed is:

1. A service processor for processing a serial data stream comprising:

(a) an input subsystem for receiving synchronized frames of the serial data stream;

(b) a pipeline first-in-first-out (FIFO) memory having an input pipe and an output pipe, wherein the pipeline memory receives data over the input pipe from the input subsystem, said output pipe being electrically coupled to both a static and frame service output subsystem and a packet header extraction subsystem;

(c) an autocapture subsystem being electrically connected to the input pipe of the pipeline memory so that data on the input pipe is available to both the pipeline and autocapture subsystem at the same time;

(d) the packet header extraction subsystem outputting data to a packet buffer multiplexer (MUX);

(e) the static and frame service output subsystem, which determines whether a frame annotation is to be prepended or appended to output frames, further comprising a frame service port for transferring data; and (f) a packet service output subsystem for receiving data from the packet buffer multiplexer, said packet service output subsystem having a packet service port for outputting data.

2. The service processor of claim 1 wherein the input subsystem further comprises a timeout mechanism.

3. The service processor of claim 2 wherein the input subsystem is capable of receiving data in byte or word format and further comprises a byte stacker for putting bytes into word format.

4. The service processor of claim 3 wherein the input subsystem further comprises a frame length counter.

5. The service processor of claim 4 further comprises a frame quality checking and lookup subsystem capable of processing different CCSDS frame versions, said frame quality checking and lookup subsystem having an input for receiving data from the autocapture subsystem, an output for sending data to the pipeline FIFO, and a frame lookup port for transferring data.

6. The service processor of claim 5 further comprises a packet quality checking and lookup subsystem, a channel state table memory and a header memory wherein the packet quality checking and lookup subsystem reads data from the header memory, said header memory inputting data from the packet header extraction subsystem, and said channel state table memory being read and being written to by said packet quality checking and lookup subsystem.

* * * * *